United States Patent
Mittal et al.

(10) Patent No.: US 9,334,372 B1
(45) Date of Patent: May 10, 2016

(54) REACTIVE POLYSILOXANES AND COPOLYMERS MADE THEREFROM

(71) Applicant: Momentive Performance Materials Inc., Waterford, NY (US)

(72) Inventors: Anuj Mittal, Bangalore (IN); Samim Alam, Tarrytown, NY (US); Raveendra Mathad, Bangalore (IN); Indumathi Ramakrishnan, Bangalore (IN); Roy Rojas-Wahl, Teaneck, NJ (US)

(73) Assignee: Momentive Performance Materials Inc., Waterford, NY (US)

( * ) Notice: Subject to any disclaimer, the term of this patent is extended or adjusted under 35 U.S.C. 154(b) by 0 days.

(21) Appl. No.: 14/631,077

(22) Filed: Feb. 25, 2015

(51) Int. Cl.
C08G 77/18 (2006.01)
C08G 77/448 (2006.01)

(52) U.S. Cl.
CPC .............. *C08G 77/448* (2013.01); *C08G 77/18* (2013.01)

(58) Field of Classification Search
None
See application file for complete search history.

(56) References Cited

U.S. PATENT DOCUMENTS

| | | | |
|---|---|---|---|
| 3,159,601 A | 12/1964 | Ashby | |
| 3,159,662 A | 12/1964 | Ashby | |
| 3,189,662 A | 6/1965 | Vaughn, Jr. | |
| 3,220,972 A | 11/1965 | Lamoreaux | |
| 3,419,634 A | 12/1968 | Vaughn, Jr. | |
| 3,715,334 A | 2/1973 | Karstedt | |
| 3,775,452 A | 11/1973 | Karstedt | |
| 3,814,730 A | 6/1974 | Karstedt | |
| 4,123,588 A | 10/1978 | Molari, Jr. | |
| 4,569,970 A | 2/1986 | Paul et al. | |
| 4,920,183 A | 4/1990 | Evans et al. | |
| 5,068,302 A | 11/1991 | Horlacher et al. | |
| 6,072,016 A | 6/2000 | Kobayashi et al. | |
| 8,158,701 B1 | 4/2012 | Gallucci et al. | |
| 8,410,238 B2 | 4/2013 | Ko et al. | |
| 2012/0296051 A1 | 11/2012 | Huggins et al. | |
| 2013/0289193 A1* | 10/2013 | Ahn | C08L 69/00 524/505 |

OTHER PUBLICATIONS

U.S. Appl. No. 62/120,540, filed Feb. 25, 2015.

* cited by examiner

*Primary Examiner* — Robert S Loewe
(74) *Attorney, Agent, or Firm* — James C. Abruzzo

(57) ABSTRACT

There is provided herein a polysiloxane having the general structural formula (I):

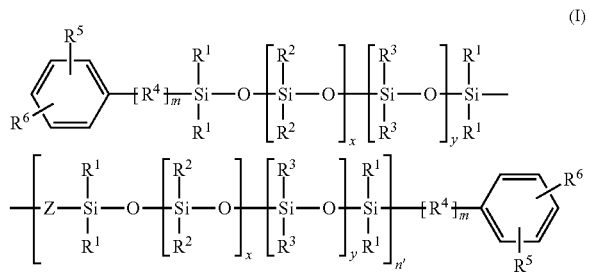

as described herein. In addition there is provided a copolymer including the polysiloxane, a composition including such a copolymer and another polymer, a method of making the same and articles therefrom.

21 Claims, No Drawings

REACTIVE POLYSILOXANES AND COPOLYMERS MADE THEREFROM

FIELD OF THE INVENTION

The invention is directed to polysiloxanes, more specifically, polycarbonate-polysiloxane copolymers and their use in polymer compositions and article made therefrom.

BACKGROUND OF THE INVENTION

Polycarbonate resins are well-known thermoplastic resins which have long been used in a variety of applications requiring resistance to impact. At low temperatures, generally lower than room temperature, polycarbonate becomes brittle and its utility is thus limited by this shortcoming. It is known that the low temperature impact strength of polycarbonate may be improved upon by the introduction (by copolymerization) of silicone blocks into the carbonate structure.

While some such copolymers have been prepared, the polycarbonate compositions containing such polysiloxane copolymers have not yet adequately shown all commercially desirable physical property benefits.

SUMMARY OF THE INVENTION

In one non-limiting embodiment herein there is provided a polysiloxane having the general structural formula (I):

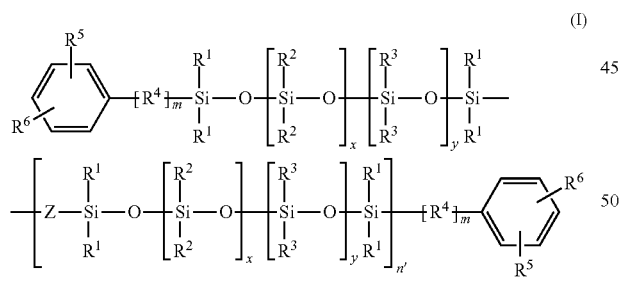

(I)

wherein each of $R^1$, $R^2$ and $R^3$ are independently a linear or branched aliphatic group containing up to about 20 carbon atoms, an un-substituted or substituted aryl group containing from 6 to about 18 carbon atoms, optionally containing at least one heteroatom, and an alicyclic group containing up to about 20 carbon atoms; each $R^4$ is independently, a divalent alkyl group of from 1 to about 6 carbon atoms, an un-substituted or substituted aryl group containing up to about 18 carbon atoms, an ester group containing up to about 8 carbon atoms, an ether group containing up to about 8 carbon atoms, or an acetate group containing up to about 8 carbon atoms; each $R^5$ is independently a hydrogen atom, a halogen atom, a linear or branched aliphatic group containing up to about 20 carbon atoms, an un-substituted or substituted aryl group containing from 6 to about 18 carbon atoms, optionally containing at least one heteroatom, an alkoxy group containing from 1 to about 8 carbon atoms, and an unsubstituted or substituted aryloxy group containing up to about 18 carbon atoms; each $R^6$ is independently a hydroxyl group, an amine group, an acid chloride group, and a sulfonyl halide group; each Z is independently selected from a divalent linear, branched or cyclic alkyl group containing from 2 to 25 carbon atoms, a divalent linear, branched or cyclic alkenyl group containing from 2 to 25 carbon atoms and a divalent un-substituted or substituted aryl group of up to about 20 carbon atoms, and the subscript x is an integer of from 1 to 250, the subscript y is from 0 to 40, the subscript n' is an integer greater than 1, and the subscript m is an integer of from to 1 to 5.

In another non-limiting embodiment herein there is provided a copolymer comprising a structural unit represented by the structural formula (V):

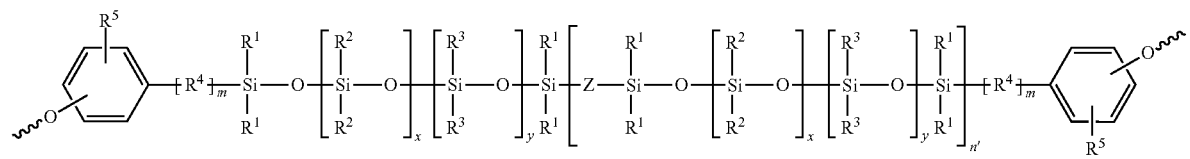

(V)

wherein each of $R^1$, $R^2$, $R^3$, $R^4$, $R^5$, 4 x, y, n' and m are as defined above, and as described herein, and wherein the curled line represents a bond to the next copolymer structural unit in the copolymer structure.

In yet another embodiment there is provided herein a method of preparing a polycarbonate-polysiloxane copolymer, comprising:

polymerizing a polysiloxane represented by the general formula (I) as described above, with a compound of the general formula (IV):

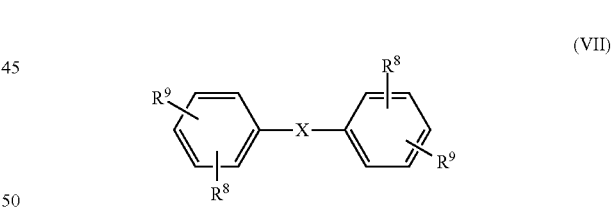

(VII)

wherein each $R^8$ is independently selected from hydrogen, halogen, an aliphatic group containing from 1 to 6 carbon atoms, an aromatic group containing from 6 to 8 carbon atoms, an alkoxy group containing from 1 to 6 carbon atoms, and an aryloxy group containing from 6 to 18 carbon atoms; and each $R^9$ is independently selected from a hydroxyl group, an amine group, an acid chloride group, and a sulfonyl halide group; and X is selected from the group consisting of:

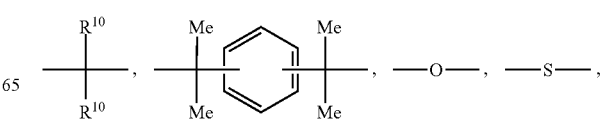

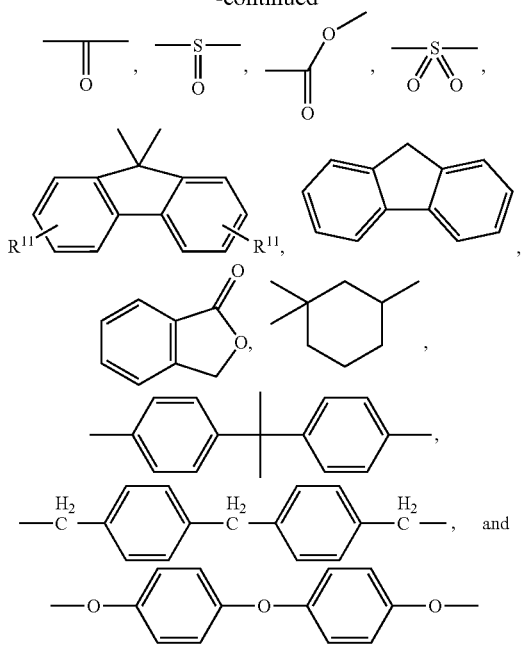

wherein each $R^{10}$ and each $R^{11}$ are independently selected from hydrogen, halogen, an alkyl group containing from 1 to 18 carbon atoms, an aryl group containing from 3 to 14 carbon atoms, an aryloxy group containing from 6 to 10 carbon atoms, an aralkyl group containing from 7 to 20 carbon atoms, an alkoxy group containing from 1 to 10 carbon atoms, a cycloalkyl group containing from 6 to 20 carbon atoms, a cycloalkoxy group containing from 6 to 20 carbon atoms, an alkenyl group containing from 2 to 10 carbon atoms, an aralkyloxy group containing from 7 to 20 carbon atoms, a nitro group, an aldehyde group, a cyano group, and a carboxyl group, and in the presence of a carbonate precursor, to provide a polycarbonate-polysiloxane copolymer.

DETAILED DESCRIPTION OF THE INVENTION

In the present invention, Applicants have prepared a novel polysiloxane compound through step-growth polymerization. Such polysiloxane compound can be used to make copolymers therefrom, e.g., polycarbonate-polysiloxane copolymers with improved physical and chemical properties. The polysiloxane compounds and copolymers herein have been found to have higher degree of polymerization which provides for improved physical properties in the resultant polymer composition such as the non-limiting examples of improvements in any one or more of thermal stability, high heat distortion temperature, comparative tracking index, flame resistance, refractive index, low temperature impact, flexibility without compromising transparency, low-melt viscosity, oxygen barrier property, UV resistance and adhesion, e.g., improved paintability.

Other than in the working examples or where otherwise indicated, all numbers expressing amounts of materials, reaction conditions, time durations, quantified properties of materials, and so forth, stated in the specification and claims are to be understood as being modified in all instances by the term "about" whether or not the term "about" is used in the expression.

As used in the claims, the word "comprises" and its grammatical variants logically also subtend and include phrases of varying and differing extent such as for example, "consisting essentially of" and "consisting of".

It will be understood that any numerical range recited herein includes all sub-ranges within that range and any combination of the various endpoints of such ranges or subranges, be it described in the examples or anywhere else in the specification.

It will also be understood herein that any of the components of the invention herein as they are described by any specific genus or species detailed in the examples section of the specification, can be used in one embodiment to define an alternative respective definition of any endpoint of a range elsewhere described in the specification with regard to that component, and can thus, in one non-limiting embodiment, be used to supplant such a range endpoint, elsewhere described.

It will be further understood that any compound, material or substance which is expressly or implicitly disclosed in the specification and/or recited in a claim as belonging to a group of structurally, compositionally and/or functionally related compounds, materials or substances includes individual representatives of the group and all combinations thereof.

Reference is made to substances, components, or ingredients in existence at the time just before first contacted, formed in situ, blended, or mixed with one or more other substances, components, or ingredients in accordance with the present disclosure. A substance, component or ingredient identified as a reaction product, resulting mixture, or the like may gain an identity, property, or character through a chemical reaction or transformation during the course of contacting, in situ formation, blending, or mixing operation if conducted in accordance with this disclosure with the application of common sense and the ordinary skill of one in the relevant art (e.g., chemist). The transformation of chemical reactants or starting materials to chemical products or final materials is a continually evolving process, independent of the speed at which it occurs. Accordingly, as such a transformative process is in progress there may be a mix of starting and final materials, as well as intermediate species that may be, depending on their kinetic lifetime, easy or difficult to detect with current analytical techniques known to those of ordinary skill in the art.

Reactants and components referred to by chemical name or formula in the specification or claims hereof, whether referred to in the singular or plural, may be identified as they exist prior to coming into contact with another substance referred to by chemical name or chemical type (e.g., another reactant or a solvent). Preliminary and/or transitional chemical changes, transformations, or reactions, if any, that take place in the resulting mixture, solution, or reaction medium may be identified as intermediate species, master batches, and the like, and may have utility distinct from the utility of the reaction product or final material. Other subsequent changes, transformations, or reactions may result from bringing the specified reactants and/or components together under the conditions called for pursuant to this disclosure. In these other subsequent changes, transformations, or reactions the reactants, ingredients, or the components to be brought together may identify or indicate the reaction product or final material.

In one embodiment herein in general formula (I) as described above (and as used elsewhere herein) each of $R^1$, $R^2$ and $R^3$ are independently a linear or branched aliphatic group containing up to about 20 carbon atoms, more specifically up to about 12 carbon atoms, more specifically up to about 8 carbon atoms, wherein in one more specific embodiment the lower endpoint of such ranges can be any one of 1, 2, 3, 4 or 5, in some embodiments the branched aliphatic group can be an unsaturated group of the aforestated carbon atom lengths, or a branched hydrocarbon radical of the aforestated carbon atom lengths; an un-substituted or substituted aryl group containing from 6 to about 18 carbon atoms, more specifically from about 6 to about 12 carbon atoms, and most specifically from 6 to about 10 carbon atoms, optionally containing at least one heteroatom, e.g., O, N or S, and in some embodiments the aryl group can be a bridged cyclic aryl group of the aforestated carbon atom lengths; and an alicyclic group containing up to about 20 carbon atoms more specifically up to about 12 carbon atoms, more specifically up to about 8 carbon atoms, wherein in one more specific embodiment the lower endpoint of such ranges can be any one of 1, 2, 3, 4 or 5.

In a further embodiment, general formula (I) as described above (and as used elsewhere herein) can be defined such that each $R^4$ is independently, a divalent alkyl group of from 1 to about 6 carbon atoms, more specifically from 1 to about 4 carbon atoms and most specifically methyl or ethyl, and in one non-limiting embodiment from about 2 to about 6 carbon atoms; an un-substituted or substituted aryl group containing up to about 18 carbon atoms, more specifically up to about 12 carbon atoms, and most specifically up to about 10 carbon atoms, wherein the lower endpoint of such ranges can be any one of 1, 2, 3, 4 or 5; an ester group containing up to about 8 carbon atoms, more specifically up to about 6 carbon atoms and most specifically up to about 3 carbon atoms, wherein the lower endpoint of such ranges can be any one of 1 or 2; an ether group containing up to about 8 carbon atoms, more specifically up to about 6 carbon atoms and most specifically up to about 3 carbon atoms, wherein the lower endpoint of such ranges can be any one of 1 or 2; or an acetate group containing up to about 8 carbon atoms, more specifically up to about 6 carbon atoms and most specifically up to about 3 carbon atoms, wherein the lower endpoint of such ranges can be any one of 1 or 2.

In yet a further embodiment, general formula (I) as described above (and as used elsewhere herein) can be defined such that each $R^5$ is independently a hydrogen atom, a halogen atom, e.g., Br, Cl, or I, a linear or branched aliphatic group containing up to about 20 carbon atoms, more specifically up to about 12 carbon atoms, more specifically up to about 8 carbon atoms, wherein in one more specific embodiment the lower endpoint of such ranges can be any one of 1, 2, 3, 4 or 5; an un-substituted or substituted aryl group containing from 6 to about 18 carbon atoms, more specifically from about 6 to about 12 carbon atoms, and most specifically from 6 to about 10 carbon atoms, optionally containing at least one heteroatom, e.g., O, N or S, and in some embodiments the aryl group can be a bridged cyclic aryl group of the aforestated carbon atom lengths; an alkoxy group containing from 1 to about 8 carbon atoms, more specifically from 1 to about 6 carbon atoms, even more specifically from 1 to about 4 carbon atoms and most specifically methoxy or ethoxy; and an unsubstituted or substituted aryloxy group containing up to about 18 carbon atoms, more specifically up to about 12 carbon atoms and most specifically up to about 10 carbon atoms.

In yet an even further embodiment, general formula (I) as described above (and as used elsewhere herein) can be defined such that each $R^6$ is independently a hydroxyl group, an amine group, an acid chloride group, or a sulfonyl halide group.

In another embodiment, general formula (I) as described above (and as used elsewhere herein) can be defined such that each Z is independently a divalent linear, branched or cyclic alkyl group containing up to 25 carbon atoms, more specifically up to about 20 carbon atoms, even more specifically up to about 16 carbon atoms, and yet even more specifically up to about 12 carbon atoms, and most specifically up to about 10 carbon atoms, e.g., 8 carbon atoms, wherein in an embodiment such ranges can have a lower endpoint of any one of 1, 2, 3, 4 or 5; a divalent linear, branched or cyclic alkenyl group containing up to 25 carbon atoms, more specifically up to about 20 carbon atoms, even more specifically up to about 16 carbon atoms, and yet even more specifically up to about 12 carbon atoms, and most specifically up to about 10 carbon atoms, e.g, 8 carbon atoms, wherein in an embodiment such ranges can have a lower endpoint of any one of 2, 3, 4 or 5, or a divalent un-substituted or substituted aryl group of up to about 20 carbon atoms, more specifically up to about 18 carbon atoms and most specifically up to about 12 carbon atoms, wherein the lower endpoint of such ranges can in some non-limiting embodiments be any one of 6, 7, 8, 9 or 10.

In one other embodiment in general formula (I) as described above (and as used elsewhere herein) the subscript x is an integer of from 1 to 250, more specifically from about 1 to about 100, even more specifically from 1 to about 50, yet even more specifically from 1 to about 25, more specifically from 1 to about 15 and most specifically from 1 to about 10. In one embodiment, the aforementioned ranges for the subscript "x" can have lower endpoints of any one of 2, 3, 4, or 5. In another embodiment in general formula (I) as described above (and as used elsewhere herein) the subscript y can be from 0 to 40, more specifically from 1 to about 30, even more specifically from 1 to about 20, yet even more specifically from 1 to about 10 and most specifically from 1 to about 8, wherein said ranges can in one embodiment, have a lower endpoint of any one of 2, 3, 4 or 5. In another embodiment the subscript m is from 1 to 5, more specifically from 1 to any one of 2, 3 or 4.

In an embodiment herein the polysiloxane of general formula (I) as described above, has a degree of polymerization as defined by the subscript n' to be greater than 1, more specifically ≥2, and most specifically ≥1.2 which is introduced between the siloxane blocks. It will be understood that these ranges of polymerization can in one non-limiting embodiment have upper endpoints of any one of 4, 5, 8, 10, 12, 15, 20, 35, 50, 75, 100, 250, 500, 1000, 2500, 5000 and 10,000. This degree of polymerization which can provide flexibility in selecting physical properties of a copolymer including the same.

In one non-limiting embodiment, each of $R^1$ and $R^2$ can be an alkyl of from 1 to 6 carbon atoms, more specifically 1 to 4 carbon atoms, more specifically methyl and ethyl, and even more specifically methyl. In one embodiment each of $R^1$ and $R^2$ are methyl. Further in some embodiments, each $R^3$ group can be an aryl group of from 6 to 8 carbon atoms, such as the non-limiting example of phenyl. In one embodiment, each $R^3$ group is phenyl. Further, in a more specific embodiment herein, the subscript x can be from 15 to 30, more specifically from 18 to 26, and in some even more specific embodiments x can be from 19 to 25, such as the non-limiting examples of 20, 22 and 24. In some embodiments, y can either be 0 or 4. In a more specific embodiment herein the definition of Z can be a divalent alkylene group of from 6 to 10 carbon atoms, more specifically from 7 to 9 carbon atoms, such as the non-limiting example of wherein Z is a divalent octylene group.

It will be understood herein that in one non-limiting embodiment, any definition of any one or more of $R^1$, $R^2$, $R^3$, $R^4$, $R^5$, Z, x, y, n' and m can also have the same definition in any formulae that appear herein that contain such variables or subscripts.

As used herein the terminology "hydrocarbon radical" includes acyclic hydrocarbon radicals, alicyclic hydrocarbon radicals and aromatic hydrocarbon radicals.

As used herein in reference to a hydrocarbon radical, the term "monovalent" means that the radical is capable of forming one covalent bond per radical, the term "divalent" means that the radical is capable of forming two covalent bonds per radical and the term "trivalent" means that the radical is capable of forming three covalent bonds per radical. Generally, a monovalent radical can be represented as having been derived from a saturated hydrocarbon compound by conceptual removal of one hydrogen atom from the compound, a divalent radical can be represented as having been derived from a saturated hydrocarbon compound by conceptual removal of two hydrogen atoms from the compound and a trivalent radical can be represented as having been derived from a saturated hydrocarbon compound by conceptual removal of three hydrogen atoms from the compound. For example, an ethyl radical, that is, a —$CH_2CH_3$ radical, is a monovalent radical; a dimethylene radical, that is, a —$(CH_2)_2$-radical, is a divalent radical and an ethanetriyl radical, that is,

radical, is a trivalent radical, each of which can be represented as having been derived by conceptual removal of one or more hydrogen atoms from the saturated hydrocarbon ethane.

As used herein, the terminology "acyclic hydrocarbon radical" means a straight chain or branched hydrocarbon radical, preferably containing from 1 to 60 carbon atoms per radical, which may be saturated or unsaturated and which may be optionally substituted or interrupted with one or more atoms or functional groups, such as, for example, carboxyl, cyano, hydroxy, halo and oxy. Suitable monovalent acyclic hydrocarbon radicals may include, for example, alkyl, alkenyl, alkynyl, hydroxyalkyl, cyanoalkyl, carboxyalkyl, alkyloxy, oxaalkyl, alkylcarbonyloxaalkylene, carboxamide and haloalkyl, such as, for example, methyl, ethyl, sec-butyl, tert-butyl, octyl, decyl, dodecyl, cetyl, stearyl, ethenyl, propenyl, butynyl, hydroxypropyl, cyanoethyl, butoxy, 2,5,8-trioxadecanyl, carboxymethyl, chloromethyl and 3,3,3-fluoropropyl.

Suitable divalent acyclic hydrocarbon radicals include, for example, linear or branched alkylene radicals, such as, for example, methylene, dimethylene, trimethylene, decamethylene, ethylethylene, 2-methyltrimethylene, 2,2-dimethyltrimethylene and linear or branched oxalkylene radicals such as, for example, methyleneoxypropylene.

Suitable trivalent acyclic hydrocarbon radicals include, for example, alkanetriyl radicals, such as, for example, 1,1,2-ethanetriyl, 1,2,4-butanetriyl, 1,2,8-octanetriyl, 1,2,4-cyclohexanetriyl and oxaalkanetriyl radicals such as, for example, 1,2,6-triyl-4-oxahexane.

As used herein the term "alkyl" means a saturated straight or branched monovalent hydrocarbon radical. In a preferred embodiment, monovalent alkyl groups are selected from linear or branched alkyl groups containing from 1 to 60 carbons per group, such as, for example, methyl, ethyl, propyl, isopropyl, n-butyl, iso-butyl, sec-butyl, tert-butyl, pentyl, hexyl, heptyl, decyl, dodecyl.

As used herein the term "alkenyl" means a straight or branched monovalent terminally unsaturated hydrocarbon radical, preferably containing from 2 to 10 carbon atoms per radical, such as, for example, ethenyl, 2-propenyl, 3-butenyl, 5-hexenyl, 7-octenyl and ethenylphenyl.

As used herein, the terminology "alicyclic hydrocarbon radical" means a radical containing one or more saturated hydrocarbon rings, specifically containing from 4 to 12 carbon atoms per ring, per radical which may optionally be substituted on one or more of the rings with one or more alkyl radicals, each preferably containing from 2 to 6 carbon atoms per alkyl radical, halo radicals or other functional groups and which, in the case of a monovalent alicyclic hydrocarbon radical containing two or more rings, may be fused rings. Suitable monovalent alicyclic hydrocarbon radicals include, for example, cyclohexyl and cyclooctyl. Suitable divalent hydrocarbon radicals include, saturated or unsaturated divalent monocyclic hydrocarbon radicals, such as, for example, 1,4-cyclohexylene. Suitable trivalent alicyclic hydrocarbon radicals include, for example, cycloalkanetriyl radicals such as, for example, 1-dimethylene-2,4-cyclohexylene, -methylethylene-3-methyl-3,4-cyclohexylene.

As used herein, the terminology "aromatic hydrocarbon radical" means a hydrocarbon radical containing one or more aromatic rings per radical, which may, optionally, be substituted on the aromatic rings with one or more alkyl radicals, each preferably containing from 2 to 6 carbon atoms per alkyl radical, halo radicals or other functional groups and which, in the case of a monovalent aromatic hydrocarbon radical containing two or more rings, may be fused rings. Suitable monovalent aromatic hydrocarbon radicals include, for example, phenyl, tolyl, 2,4,6-trimethylphenyl, 1,2-isopropylmethylphenyl, 1-pentalenyl, naphthyl, anthryl, eugenol and allylphenol as well as aralkyl radicals such as, for example, 2-phenylethyl. Suitable divalent aromatic hydrocarbon radicals include, for example, divalent monocyclic arenes such as, for example, 1,2-phenylene, 1,4-phenylene, 4-methyl-1,2-phenylene, phenylmethylene. Suitable trivalent aromatic hydrocarbon radicals include, for example, trivalent monocyclic arenes such as, for example, 1-trimethylene-3,5-phenylene.

In a non-limiting embodiment herein the polysiloxane compound of the general formula (I) as described herein can be made by step-growth polymerization. For example, there is provided in one embodiment a method which comprises hydrosilylating a hydride-terminated polysiloxane, such as a hydride-terminated polysiloxane represented by the general structural formula (II):

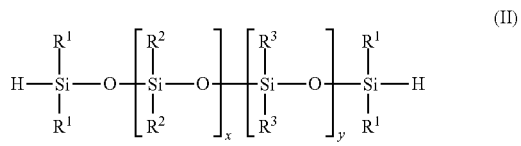

wherein each $R^1$, $R^2$ and $R^3$ are as defined herein, with a diene. The diene in one embodiment can comprise a diene which contains a linear, branched or cyclic alkyl group containing from 2 to 25 carbon atoms, or more specifically any of the ranges of carbon atoms provided herein for the divalent alkyl group of the variable Z. Alternatively, the diene can contain a linear, branched or cyclic alkenyl group of from 2 to 25 carbon atoms, or more specifically any of the ranges of carbon atoms provided herein for the divalent alkenyl group of the variable Z.

This hydrosilylating of formula (II) with diene can be done under convention hydrosilylation conditions, such as with the use of a precious metal catalyst, e.g., a platinum catalyst, and in some non-limiting embodiments can be conducted at a temperature of from 80 to about 110 and for a period of from about 5 to about 8 hours.

Many types of precious metal catalysts, e.g., platinum catalysts are known and such platinum catalysts may be used for the hydrosilylation reaction in the present invention. When optical clarity is required the preferred platinum catalysts are those platinum compound catalysts that are soluble in the reaction mixture. The platinum compound can be selected from those having the formula (PtCl$_2$Olefin) and H(PtCl$_3$Olefin) such as described in U.S. Pat. No. 3,159,601, which is hereby incorporated by reference in its entirety. A further platinum containing material usable in the compositions of the present invention is the cyclopropane complex of platinum chloride described in U.S. Pat. No. 3,159,662 which is hereby incorporated by reference in its entirety. Further the platinum containing material can be a complex formed from chloroplatinic acid with up to 2 moles per gram of platinum of a member selected from the class consisting of alcohols, ethers, aldehydes and mixtures of the above as described in U.S. Pat. No. 3,220,972 which is hereby incorporated by reference in its entirety. The catalysts most specifically used herein are described in U.S. Pat. Nos. 3,715,334; 3,775,452; and 3,814,730 to Karstedt the contents of which are incorporated by reference herein in their entireties. Additional background concerning the art may be found at J. L. Spier, "Homogeneous Catalysis of Hydrosilation by Transition Metals, in Advances in Organometallic Chemistry, volume 17, pages 407 through 447, F. G. A. Stone and R. West editors, published by the Academic Press (New York, 1979), the contents of which is incorporated by reference in its entirety.

In one embodiment the precious metal catalysts that may be used herein, may include the non-limiting examples of rhodium, ruthenium, palladium, osmium, iridium and platinum catalysts and combinations thereof.

In one embodiment herein the platinum catalyst is in a soluble complex form.

In one other embodiment, the platinum catalyst is selected from the group consisting of platinic chloride, chloroplatinic acid, bis(acetylacetonato)platinum, ($\eta^5$-Cyclopentadienyl)trialkylplatinum and combinations thereof.

Persons skilled in the art can easily determine an effective amount of precious metal catalyst. The catalyst can be present in a very wide range, but normally a range of from between 0.1 and 10,000 ppm, more specifically from between 1 and 100 ppm.

The method of hydrosilylating of formula (II) with diene can provide a hydride-terminated polysiloxane represented by the structural formula (III):

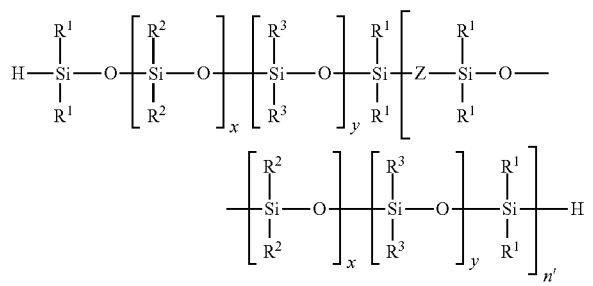

(III)

wherein each of $R^1$, $R^2$, $R^3$, Z, x, y and n' are as defined.

In one embodiment, the method can then further comprise hydrosilylation of the hydride-terminated polysiloxane of formula (III) with an unsaturated compound of the general formula (IV):

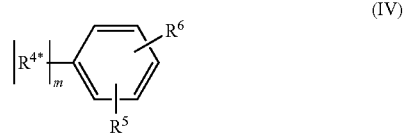

(IV)

where $R^5$ and $R^6$ are as defined and where $R^{4*}$ is selected from alkenyl group containing from 2 to 6 carbon atoms, more specifically 2 to 4 carbon atoms, such as an allyl group or a vinyl group, allyl acetate group containing up to 8 carbon atoms, a vinyl acetate group containing up to 8 carbon atoms, allyl carbonyloxy group of up to 8 carbon atoms, allyl phenyl group of up to about 18 carbon atoms, vinyl phenyl group of from 8 to about 18 carbon atoms, allyl ether group of up to 8 carbon atoms, vinyl ether group of up to 8 carbon atoms, wherein one or more of such R4* groups can optionally contain one or more of a hydroxyl group, an alkoxy group of from 1 to 4 carbon atoms, a hetero atom, and the subscript m is an integer of from 1 to 5 and as described herein, and when the subscript m=1, then the aforementioned groups of $R^{4*}$ are terminal groups, and when the subscript m is >1 then the aforementioned groups of $R^{4*}$ comprise at least one divalent group and one terminal group, to obtain the polysiloxane compound (I) of claim 1. Some non-limiting examples of the compound of the general formula (IV) include eugenol, allylphenol, vinylphenol, o or m-alkoxy-allylphenol, o or m-alkoxy-vinylphenol, allyl-4-((tetrahydro-2H-pyran-2-yl)oxy)benzoate, allyl 2-(4-((tetrahydro-2H-pyran-2-yl)oxy)phenyl)acetate. Such hydrosilylation can occur at the same conditions as described above.

In one non-limiting embodiment, instead of hydrosilylation, the polysiloxane of the general formula (I) can also be prepared by any one or more of anionic polymerization, free-radical polymerization, ring-opening metathesis polymerization (ROMP), acyclic diene metathesis (ADMET), and coordination polymerization, which polysiloxane of the general formula (I) can also used as structural unit in the copolymer described herein.

In a non-limiting embodiment herein there is provided a method for the preparation of the reactive polysiloxane of formula (I) which is depicted by the reaction scheme:

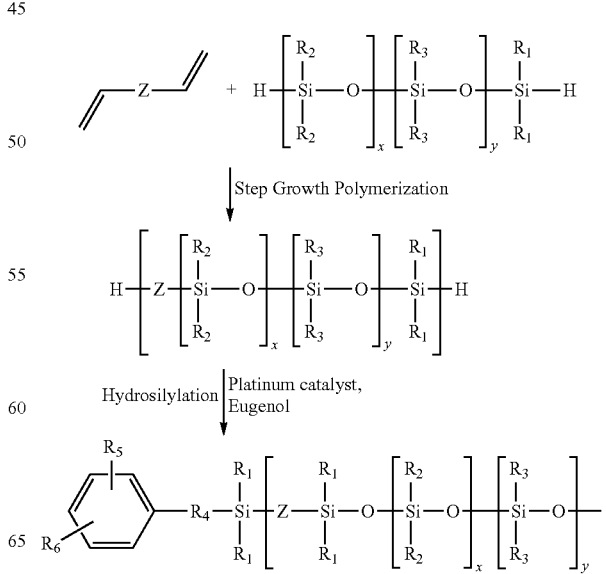

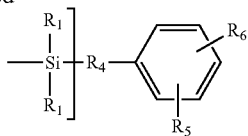

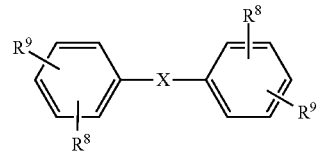

The hydrolsilyation steps in the above reaction scheme can be conducted under the conditions described above.

In an embodiment herein in the method described for making the polysiloxane (I) after the hydrosilylation of the compound of formula (III) with the compound of formula (IV), the method can further comprise purifying the siloxane of the formula (I) from the reaction product mixture. Any conventional method of purification can be used, such as filtration, extraction, distillation and the like. Some more specific methods of purifying the reaction product mixture can comprise thin film evaporation, pre-evaporation, a vapor-liquid separation, a packed bed column distillation, a rotary thin film evaporation and an evaporator-stripper purification.

The polysiloxane compounds of general formula (I) have improved properties over that of conventional polysiloxane compounds that are used in polymer compositions, e.g., polycarbonate compositions, such as polysiloxanes which do not have one or more polymerized alkyl, alkenyl or aryl spacers in the molecule. In one non-limiting embodiment the polysiloxane of general formula (I) can have an improvement over such other siloxanes in an improvement in at least one of refractive index, temperature of decomposition, high molecular weight, lower polydispersity, unimodal distribution and glass transition temperature.

In one embodiment, the polysiloxane of general formula (I) can have one or more of a refractive index of from 1.40 to about 2.25, more specifically from about 1.42 to about 1.98; a temperature of decomposition of from about 350 to about 520° C. and more specifically from about 375 to about 500° C.; a high molecular weight of from about 3.5 to about 12 kDa more specifically from about 4.0 to about 10.0 kDa, said molecular weights being weight average molecular weights; lower polydispersity of from about 1.10 to about 3.0, more specifically from about 1.20 to about 2.5; and a glass transition temperature of from about −60 to about 130° C.

In yet another embodiment herein there is provided a copolymer comprising a structural unit represented by the general formula (V) as described above. In one non-limiting embodiment, the copolymer comprising the structural unit represented by general formula (V) can further comprise a structural unit of any one or more of a polycarbonate, a polyester, a polyetherketone and a polysulfone.

In one non-limiting embodiment, the copolymer comprising the structural unit represented by general formula (V) can further comprise a structural unit having the general formula (VI):

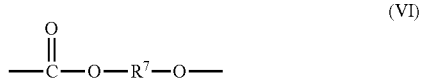

wherein each $R^7$ is a divalent hydrocarbon group containing from 1 to 60 carbon atoms, more specifically from 1 to 20 carbon atoms, even more specifically from 1 to 12 carbon atoms and most specifically from 1 to 8 carbon atoms, a group derived from a structural unit having the general formula (VII):

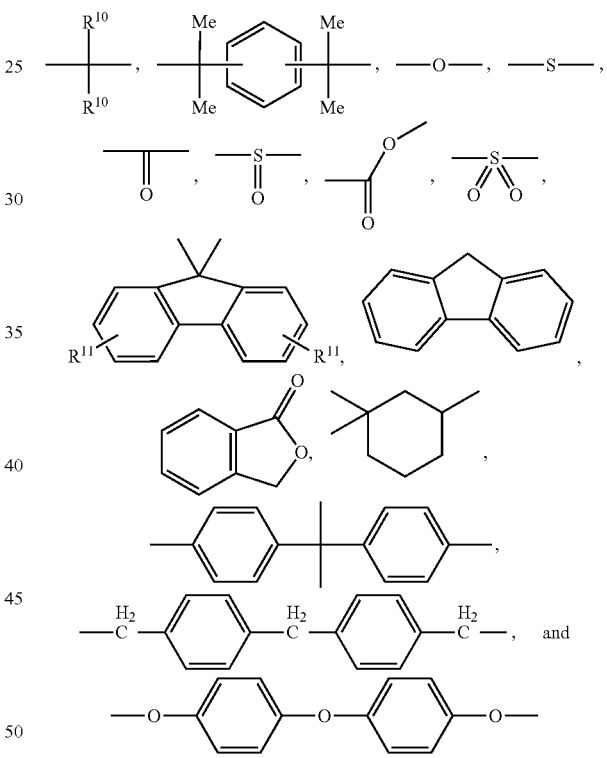

where each $R^8$ is independently selected from hydrogen, halogen, an aliphatic group containing from 1 to 6 carbon atoms, more specifically from 1 to 4 carbon atoms, an aromatic group containing from 6 to 8 carbon atoms, an alkoxy group containing from 1 to 6 carbon atoms, more specifically from 1 to 4 carbon atoms, and an aryloxy group containing from 6 to 18 carbon atoms, more specifically from 6 to 12 carbon atoms; each $R^9$ is independently selected from a hydroxyl group, an amine group, an acid chloride group, and a sulfonyl halide group; and, X is selected from the group consisting of:

wherein each $R^{10}$ and $R^{11}$ each are independently selected from hydrogen, halogen, an alkyl group containing from 1 to 18 carbon atoms, more specifically from 1 to 12 carbon atoms, and most specifically 1 to about 6 carbon atoms, an aryl group containing from 3 to 14 carbon atoms, more specifically from 6 to about 12 carbon atoms and most specifically from 6 to about 10 carbon atoms, an aryloxy group containing from 6 to 10 carbon atoms, an aralkyl group containing from 7 to 20 carbon atoms, more specifically from 7 to about 16 carbon atoms and most specifically from 7 to about 12 carbon atoms, an alkoxy group containing from 1 to 10 carbon atoms, more specifically from 1 to about 8 carbon atoms and most specifically from 1 to about 6 carbon atoms, a cycloalkyl group containing from 6 to 20 carbon atoms, more specifically from 6 to about 16 carbon atoms and most specifically from 6 to about 12 carbon atoms, a cycloalkoxy group containing from 6 to 20 carbon atoms, more specifically from 6 to about 16 carbon atoms and most specifically from 6 to about 12 carbon atoms, an alkenyl group containing from 2 to 10 carbon atoms, more specifically from 2 to about 6 carbon atoms and most specifically from 2 to about 4 carbon atoms, an aralkyloxy group containing from 7 to 20 carbon atoms, a nitro group, an aldehyde group, a cyano group, and a carboxyl group. In one embodiment herein the copolymer is a polycarbonate-polysiloxane copolymer. In some embodiments, the copolymer herein can be an ABA type copolymer or a $(AB)_n$ type copolymer. In a more specific embodiment, the molecular weight of the copolymer can be from about 25,000 to about 80000, more specifically from about 30,000 to about 75,000 which molecular weights are weight average with respect to Polystyrene Standard. In some embodiments the copolymer is transparent.

The copolymer herein, e.g., the polycarbonate-polysiloxane copolymer, can have an improvement in physical and/or chemical properties over that of polycarbonate-polysiloxane copolymers which do not have one or more polymerized alkyl, alkenyl or aryl spacers in the polysiloxane unit. Some such improved properties are one or more properties selected from thermal stability, high heat distortion temperature, comparative tracking index, flame resistance, refractive index, low temperature impact, flexibility without compromising transparency, low-melt viscosity, UV resistance and adhesion, e.g., improved paintability.

In one embodiment, copolymer described herein, e.g. a polycarbonate-polysiloxane copolymer, can have one or more of a heat deflection temperature of from about 120 to about 160° C. and more specifically from about 125 to about 150° C.; a comparative tracking index of from about 100 to about 400 V and more specifically from about 175 to about 250 V; a flame resistance derived through oxygen index value of at least 35%; a low temperature impact strength values derived through notched izod impact energies of from about 15 to about 30 KJ/m$^2$ and more specifically from about 12 to about 25 KJ/m$^2$; a tensile modulus of from about 300000 to about 320000 psi and more specifically from about 302000 to about 310000 psi; and a UV resistance derived through yellowness index of at least 0.8 to 2.4.

In one further embodiment herein there is provided a composition comprising the copolymer described herein and at least one of a polycarbonate homopolymer, a different polycarbonate copolymer, i.e., not the polycarbonate-polysiloxane copolymer containing units of structural formula (V), a polycarbonate-polyester, a polyester, a polysulfone, a polyethersulfone, a polyetheretherketone, a polyimide and a polyetherimide.

In some embodiments, the amount of copolymer in the composition can comprise from about 0.01 weight percent (wt %) to about 99.99 wt %, more specifically from about 1 wt % to about 60 wt % and most specifically from about 2 wt % to about 30 wt %, said wt % being based on the total weight of the composition.

Further, as described above, there is provided herein a method of preparing a polycarbonate-polysiloxane copolymer as described herein, which comprises polymerizing a polysiloxane represented by the general formula (I) with a compound of the general formula (IV), in the presence of a carbonate precursor, to provide the polycarbonate-polysiloxane copolymer.

The polymerizing of general formula (I) with (IV) can comprise interfacial polymerization process, such as one conducted in the presence of at least one of a solvent, a caustic and optionally one or more catalysts. Some non-limiting examples of suitable solvents for the polymerization can comprise cyclohexane, chloroform, cyclohexane-chloroform solvents, tetra-chloromethane and combinations thereof. Examples of caustics can include sodium hydroxide, potassium hydroxide, ammonium hydroxide, lithium hydroxide, triethylamine (TEA), tetramethylammonium hydroxide (TMAH), and mixtures thereof. Suitable catalysts can include precious metal catalysts as described herein, the trialkylamines such as triethylamine, triamylamine, tributylamine, tripropylamine, and the like; phase transfer catalysts such as ammonium salts, phosphonium salts, crown ethers, cryptands, linear polyethers on insoluble polymer supports, quaternary ammonium compounds such as tetramethyl ammonium hydroxide, octadecyl triethyl ammonium chloride, benzyl trimethyl ammonium chloride and the like. If desired, well known chain stoppers such as p-tertiarybutyl phenol and phenols can be added to the reaction mixture to control the molecular weight of the copolymer resins.

In one non-limiting embodiment the polymerizing step comprising reacting bisphenol A with triphosgene in a biphasic solvent in the presence of a phase transfer catalyst to form a bischloroformate; and adding a hydroxy-terminated silicone of formula (I) to form the polycarbonate-polysiloxane copolymer described herein. In a more specific embodiment, the chloroformates of the hydroxy-terminated silicone are formed in a tube reactor, and then added into an interfacial polycondensation reactor with catalyst.

In one embodiment herein the carbonate precursor is at least one selected from the group consisting of phosgene, diphosgene, triphosgene, diarylcarbonates such as diphenyl carbonate, phenyl-tolyl-carbonate, phenyl-chlorophenyl-carbonate, 2-tolyl-4-tolyl-carbonate and 4-tolyl-4-chlorophenyl-carbonate, and bis(methylsalicyl)carbonate.

In one embodiment herein any one of the polysiloxane of the general formula (I), the copolymer thereof as described herein, or the composition of copolymer and further polymer described herein can be used to form an article. The article can be any article that would be benefited by the improved physical and/or chemical properties described herein. Some technologies that would benefit such an article include automotive, electronic and medical technologies. Some non-limiting examples of suitable articles are a mobile phone housing, a frozen food service equipment, a helmet, a helmet shield, an automotive windshield, a motorcycle windshield, an automotive sunroof, a roof, a dashboard, a headlamp, or an electric screen a medical article, a medical tube, a medical bag. In one embodiment the article can be made by molding, shaping, or forming the any one of the polysiloxane of the general formula (I), the copolymer thereof as described herein, or the composition of copolymer and further polymer described herein to obtain the article.

EXAMPLES

Example 1

Step-A

Synthesis of bis-Functional Siloxane Hydride: ($^H$M-D$_x$M$^H$)

200 g of 2,4,6,8-octamethyltetracyclosiloxane (D$_4$) was equilibrated with 15 g of 1,1,3,3-tetramethyldisiloxane, (TMDS) using concentrated H$_2$SO$_4$ catalyst. The reaction mixture was brought to 60° C. and stirred under N$_2$ for 16-24 h. Thereafter, reaction mixture was neutralized and filtered through Celite. The residuals were removed under reduced pressure (150° C./5 mbar) to give colorless viscous fluid ($^H MD_x M^H$). $M^H$=SiH(CH$_3$)$_2$O$_{1/2}$, D=Si(CH$_3$)$_2$O$_{2/2}$ and x is 20,

Step-B

Synthesis of Bis-Functional Polyalkylene-Siloxane Hydride by Step-Growth Polymerization: ($^H$M-D$_x$ZM$^H$)

A 250 ml RB flask was charged with 100 g of $^H MD_x M^H$ prepared in Step A, and a stoichiometric amount of 1,7-octadiene, along with Speier's catalyst (H$_2$PtCl$_6$) chloroplatinic acid, at 110° C. for 10 h. Thereafter, reaction mixture was cooled and filtered through diatomaceous earth. The residual materials were removed under reduced pressure (150° C./5 mbar) to give colorless viscous fluid ($^H MD_x ZM^H$) where the definitions of $M^H$, D, and x are as defined above, and Z is a —(CH$_2$)$_8$— moiety,

Step-C

Synthesis of Eugenol Endcapped Bis-Functional Polyalkylene-Siloxane: ($^{Eu} MD_x ZM^{Eu}$)

A 250 ml RB flask was charged with 100 g of $^H MD_x ZM^H$ prepared in Step B, and a stoichiometric amount of eugenol, along with Speier's catalyst (H$_2$PtCl$_6$) chloroplatinic acid, for 110° C. for 10 h. Thereafter, the reaction mixture was cooled and filtered through diatomaceous earth. The residual materials were removed under reduced pressure (150° C./5 mbar) to give colorless very viscous fluid ($^{Eu} MD_x ZM^{Eu}$) of the following formula:

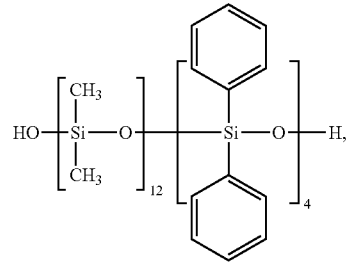

149 g of hydrogen terminated methyl siloxane fluid of structure

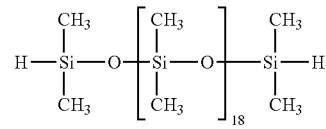

and 81.5 g of octamethylcyclotetrasiloxane. The mixture was heated to 90° C. and then linear phosphonitrilic chloride (LPNC) catalyst was added for condensation and rearrangement reactions. The mixture was vacuumed to 90 mmHg and held at 90° C. for 20 hours. The reaction mixture then had added thereto 15.3 g of sodium hydrogen carbonate to neutralize the LPNC catalyst. The mixture was cooled to under 40° C. and filtered with Radiolite #800 available from Showa Chemical Industry, Co., Ltd. The residuals were removed under reduced pressure (150° C./5 mbar) to give a colorless

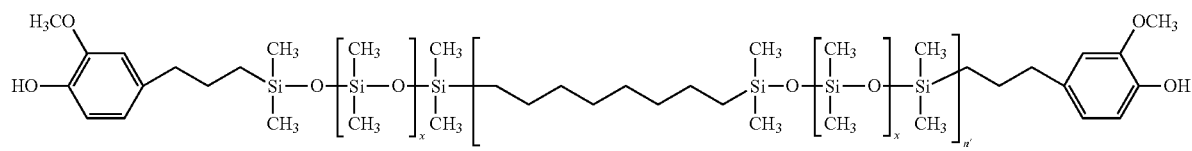

where x is 20, and n' is 1.6.

The same procedure was then repeated to obtain the product of Example 1, step C in different molecular weights and n' values (data shown in Table 1, Example 1a and 1b).

Example 2

Step-A

Synthesis of Bis-Functional Dimethyl-DiphenylSiloxane Hydride: $^H MD_x D_y M^H$ A 1 L 3-necked round flask equipped with a mechanical stirrer, a thermometer and vacuum distillation was charged 352 g of silanol-terminated methyl phenyl siloxane fluid of structure viscous fluid $^H MD_x D_y M^H$, $M^H$=SiH(CH$_3$)$_2$O$_{1/2}$, D=Si(CH$_3$)$_2$ O$_{2/2}$ and x is 24 and y is 4.

Step-B

Synthesis of Bis-Functional Polyalkylene-Siloxane Hydride by Step-Growth Polymerization: ($^H$M [ZD$_x$D$_y$]$_n$M$^H$)

A 250 ml RB flask was charged with 100 g of $^H MD_x D_y M^H$ prepared in Step A, and a stoichiometric amount of 1,7-octadiene at 110° C. for 10 h. Thereafter, the reaction mixture was cooled and filtered through diatomaceous earth. The residual materials were removed under reduced pressure (150° C./5 mbar) to give a colorless very viscous fluid ($^H$M [ZD$_x$D$_y$]$_n$M$^H$). The definitions of $M^H$, D, x, and y, are as defined above, n' is 1.2 and Z is a —(CH$_2$)$_8$— moiety.

Step-C

Synthesis of Eugenol Endcapped Bis-Functional Polyalkylene-Siloxane: ($^{Eu}$M[ZD$_x$D$_y$]$_n$M$^{Eu}$)

250 mL reaction flask was charged with 100 g of $^H$M[ZD$_x$D$_y$]$_n$M$^H$ as prepared in Step B above along with Speier's catalyst (H$_2$PtCl$_6$) chloroplatinic acid stirred under N$_2$, and brought to 80° C. Thereafter, a stoichiometric amount of eugenol was charged to an addition funnel and added drop-wise at a rate to maintain a reaction temperature of 100° C. Following the addition, the reaction was brought to 120° C. and maintained for 2 h. Completion of the hydrosilylation reaction was confirmed by NMR. The reaction mixture was allowed to cool, treated with Celite and filtered. The residual materials were removed under reduced pressure (150° C./5 mbar) to give colorless fluid ($^{Eu}$M[ZD$_x$D$_y$]$_n$M$^{Eu}$) of the following formula:

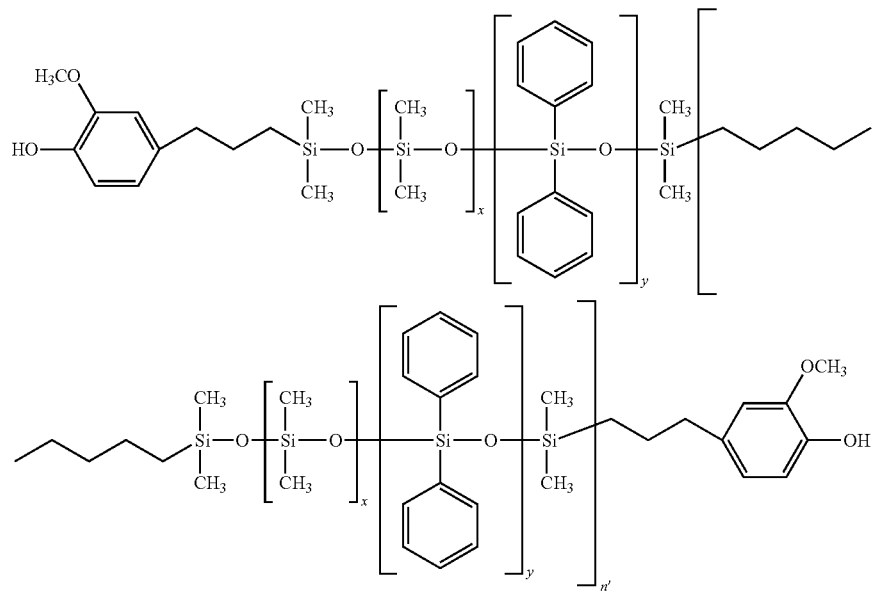

where x is 24, y is 4 and n' is 1.2.

Comparative Example 1

Eugenol Terminated Dimethylpolysiloxane without Z Unit

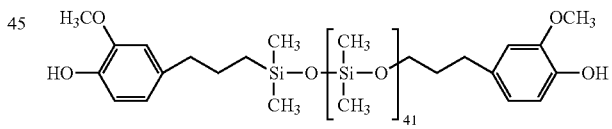

TABLE 1

Various Substituents on Reactive Polysiloxane

| Example | MW[a] (kDa) | PDI[b] | T$_d$[c] (° C.) | T$_g$[d] (° C.) | RI[e] | Viscosity ƒ (Pas) | n' NMR[g] | n' GPC[h] |
|---|---|---|---|---|---|---|---|---|
| Example 1 | 5.10 | 1.52 | 381 | −115 | 1.4272 | 0.0775 | 1.6 | 2.75 |
| Example 1a | 4.25 | 1.42 | 481 | −114 | 1.4274 | 0.0850 | 1.8 | 2.29 |
| Example 1b | 4.70 | 1.30 | 465 | −112 | 1.4275 | 0.0778 | 1.4 | 2.53 |

TABLE 1-continued

Various Substituents on Reactive Polysiloxane

| Example | MW[a] (kDa) | PDI[b] | $T_d{}^c$ (° C.) | $T_g{}^d$ (° C.) | RI[e] | Viscosity $f$(Pas) | n' NMR[g] | n' GPC[h] |
|---|---|---|---|---|---|---|---|---|
| Example 2 | 7.50 | 2.20 | 426 | −70, −90 | 1.4730 | 0.5968 | 1.2 | 2.66 |
| Comparative Example 1 | 5.70 | 1.32 | 448 | −118 | 1.4210 | 0.0966 | NA | |

[a] GPC/SEC was performed in CHCl₃ at 1 mL/min.
[b] PDI (polydispersity index) were evaluated using PS standards. The results are the average of two runs,
[c] Thermal stability using 20°/min heating from 40-800° C;
[d] (glass transition temperature) determined from DSC (−120 to 200° C) at heating rate of 10°/min,
[e] (refractive index) Determined using Abbe refractometer at 589 nm, RT,
[f] viscosity in Pas using Haake Rheometer (RheoStress 600) cone plate,
[g] DP (degree of polymerization) obtained by quantitative 13C NMR study,
[h] DP obtained by dividing MW (molecular weight) (SEC) of fluid by repeat unit FW (formula weight) of the fluid.

Example 1'

Synthesis of Polycarbonate-Polysiloxane Copolymers 9.132 g of bisphenol-A (BPA), 2.283 g of siloxane fluid of the following structure

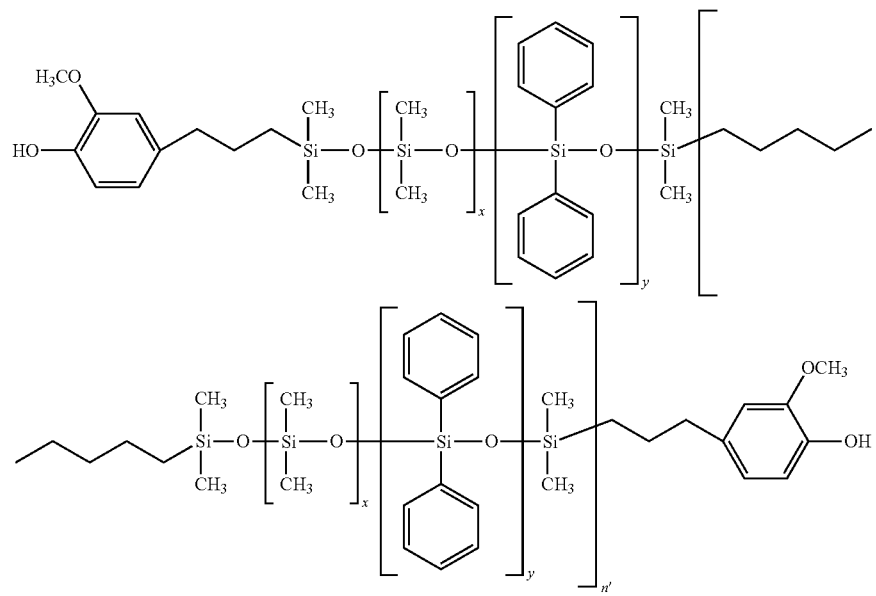

where x is 24, y is 4 and n' is 1.2, and 0.113 g of phase transfer catalyst (BTAC: benezene triethylammonium chloride) were added to the four necked round bottomed (RB) flask containing 50 mL each of water and dichloromethane (DCM). 7.56 g of triphosgene was weighed in a glass vial under nitrogen atmosphere; dissolved in 25 mL DCM and transferred to the addition funnel connected to the RB flask. 25 mL of 25-30 wt % NaOH solution was transferred to second additional funnel fixed in the reactor. Both triphosgene and NaOH are added to the reaction mixture simultaneously with vigorous stirring (300-400 rpm). NaOH addition was carefully done in such a way that pH of the reaction mixture was maintained between 5 and 6; stirring was further continued for another 40-60 min.

Thereafter an amount of NaOH required to increase the pH to 10-11 was added. The reaction mixture was stirred for another 5-10 min, 0.2123 g of 4-cumyl phenol (pCP) and 50.6 mg of triethyl amine (TEA) were added. Stirring was continued for another 5-10 min and the pH was increased to 12 by adding aqueous NaOH. The reaction was stopped and the organic layer was separated from the aqueous layer using separating funnel. The polymer (organic layer) was washed with 1N HCl and precipitated in 3-4 liters of methanol. The final product was dried overnight in a vacuum oven ($10^{-3}$ mm of Hg) maintained at 60-70° C.

Example 2'

Synthesis of Polycarbonate-Polysiloxane Copolymers

A similar procedure to that which was described in Example 1' was followed for the siloxane fluid of following structure (Example 2')

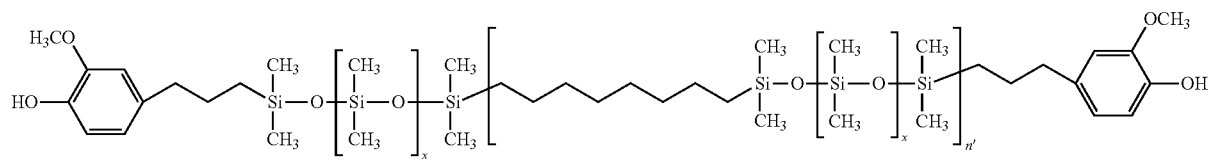

where x is 20, and n' is 1.6.

Comparative Example 1'

Synthesis of Polycarbonate-Polysiloxane Copolymers

A similar procedure as was described in Example 1' was followed for the siloxane fluid of following structure (Comparative Example 1')

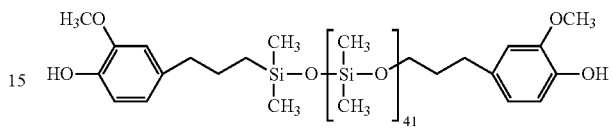

TABLE 2

Polycarbonate-Polysiloxane copolymerization and thermal stability

| Ex | % Siloxane in Copolymer[a] | $M_W$[b] | PDI[c] | $T_d$ (°C.)[d] Peak | 5 wt% | $T_g$[e] (°C.) | $M_{n,SEC}$[f] (kDa) | $n'_{av}$[g] | Block Ratio[h] |
|---|---|---|---|---|---|---|---|---|---|
| Example 1' | 13 | 71,574 | 2 | 650 | 402 | 147 | 34.84 | 119.5 | 1/6.3 |
| Example 2' | 8 | 54,393 | 1.4 | 643 | 431 | 148 | 37.43 | 136.8 | 12-Jan. |
| Comparative Example 1' | 7 | 64,852 | 1.5 | 648 | 440 | 149 | 42.97 | 159.3 | 1/14.9 |

[a] siloxane composition in copolymer obtained from 1H NMR study,

[b] GPC/SEC was performed in CHCl₃ at 1 mL/min,

[c] PDI were evaluated using PS standards. The results are the average of two runs,

[d] thermal stability using 20°/min heating from 40-800° C.;

[e] determined from DSC (−120 to 200° C.) at heating rate of 10°/min,

[f] GPC/SEC was performed in CHCl₃ at 1 mL/min,

[g] Average DP (n'av) obtained by dividing Mn, SEC of copolymer by average repeat unit FW of copolymer

[h] block ratio means on average how many units of BPA are linked with one unit of siloxane in a given copolymer structure Example-1' is a copolymer of Example 1 and polycarbonate;

Example-2' is a copolymer of Example 2 and polycarbonate;

Comparative Example 1' is a copolymer of Comparative Example 1 and polycarbonate;

PDI is polydispersity index;

$T_d$ is the temperature of decomposition;

$T_g$ is the glass transition temperature.

Example-1' is a copolymer of Example 1 and polycarbonate;
Example-2' is a copolymer of Example 2 and polycarbonate;
Comparative Example 1' is a copolymer of Comparative Example 1 and polycarbonate;
PDI is polydispersity index;
$T_d$ is the temperature of decomposition;
$T_g$ is the glass transition temperature.

Blending of PC-Homopolymer and Synthesized Polycarbonate-Polysiloxane Copolymers:

Up to 25 wt % of the polycarbonate-polysiloxane polymers made were melt-blended in Haake MiniLab II as a mini extruder with approximately 75 wt % of polycarbonate at 290° C. for 7 min. Different geometries of test samples such as tensile bar, dumb-bell, disc etc. were compression molded using injection molding to get the desired plastic article.

Tensile Tests:

Tensile tests of dumb-bell shaped specimens were carried out using an Instron tensile tester using a 5 KN load cell. The gauge length of the dog-bone specimens was 0.97 inch and the cross-head speed was 0.2 inch/min. The data were analyzed using Bluehill Lite software. Table 3 describes the results obtained from the tensile tests.

TABLE 3

Tensile Test of Blends

| Blend Type | Young's Modulus (psi) | Tensile Stress at Yield (psi) | Tensile Strain at Break (%) |
| --- | --- | --- | --- |
| Example 1' | 140,355 ± 10,480 | 9,814 ± 1,261 | 165 ± 5.6 |
| Comparative Example 1' | 139,764 ± 10,196 | 9,879 ± 1,486 | 171 ± 5.6 |
| PC Homopolymer | 129,977 ± 9,215 | 9,539 ± 1,493 | 175 ± 7 |

Typically, the tensile strength measurements depicts that the incorporation of polycarbonate-polysiloxane copolymers of invention into the polycarbonate homopolymer are maintaining the polycarbonate material property without any decrement in material property in spite of improving the other properties while addition.

Notched Izod Tests:

This test procedure was based on the ISO 180/1A method. The results of the test were reported in terms of energy absorbed per unit of specimen width, and expressed in Izod Notch Energies (KJ/m2). Typically the final test result is calculated as the average of test results of five test bars.

TABLE 4

Izod Test of Blends

| Blend Type | Izod test at 23° C. | Izod test at 0° C. | Izod test at −20° C. | Izod test at −40° C. | Izod test at −60° C. |
| --- | --- | --- | --- | --- | --- |
| Example 1' | 67.86 | 23.62 | 20.37 | 15.11 | 12.24 |
| Standard Deviation | 14.27 | 3.05 | 1.13 | 1.01 | 2.99 |
| Comparative example 1' | 60.72 | 23.48 | 20.47 | 16.05 | 12.38 |
| Standard Deviation | 1.75 | 2.54 | 2.21 | 2.25 | 0.89 |
| PC Homopolymer | 68.08 | 18.07 | 16.18 | 12.87 | 9.93 |
| Standard Deviation | 3.99 | 1.24 | 0.86 | 0.62 | 1.39 |

As the Izod test temperature lowers below the room temperature, the energy absorbed by polycarbonate-polysiloxane copolymers of the invention incorporated blends are significantly higher than the polycarbonate homopolymer.

UV Weathering Resistance Test:

Square plaques of 3 mm thickness were studied for UV weathering resistance test. The detailed description is as follows: Plaques were exposed directly to a UVB light (313 nm wave length) inside a Q-U-V accelerated weathering tester supplied by the Q-Panel company, OH. The Q-U-V chamber was maintained at a constant temperature of 50° C. for the entire time of UVB light exposure. The yellowness index (YI) of a plaque was measured by using a X-rite Color-Eye 7000A instrument and calculated according to the ASTM E313. Optical properties (transparency and haze) of a plaque were evaluated by using a haze-gard plus from BYK Gardner. The yellowness index, percentage of transparency and percentage of haze of plaques were measured before UVB exposure (0 hours) and after UVB exposure for a certain time, t. The difference of yellowness index (ΔYI) is calculated according to the following equation and shown in table 5. ΔYI=YI after UVB light exposure for time 't'−YI before UVB light exposure.

TABLE 5

Yellowness index value for blended plaques before and after exposure to UVB

| Sample | Parameter | UV exposure time | | | | | | |
| --- | --- | --- | --- | --- | --- | --- | --- | --- |
| | | t = 0 hours | t = 5 hours | t = 23 hours | t = 45 hours | t = 72 hours | t = 174 hours | t = 363 hours | t = 812 hours |
| Example 1' | YI | 7.07 | 10.57 | 15.45 | 18.43 | 20.93 | 25.39 | 27.82 | 29.33 |
| | ΔYI | 0 | 3.5 | 8.38 | 11.36 | 13.86 | 18.32 | 20.75 | 22.26 |
| Comparative example 1' | YI | 8.7 | 12.79 | 17.75 | 20.89 | 23.52 | 31.11 | 36.37 | 36.27 |
| | ΔYI | 0 | 4.09 | 9.05 | 12.19 | 14.82 | 22.41 | 27.67 | 27.57 |
| PC Homopolymer | YI | 0.78 | 4.28 | 9.16 | 12.41 | 14.91 | 23.12 | 26.96 | 28.17 |
| | ΔYI | 0 | 3.5 | 8.38 | 11.63 | 14.13 | 22.34 | 26.18 | 27.39 |

Similarly, the ΔTransparency and ΔHaze were calculated and shown in Table 6 and 7 respectively.

TABLE 6

Percentage of transparency value blended plaques before and after exposure to UVB

| Sample | Parameter | UV exposure time | | | | | | | |
|---|---|---|---|---|---|---|---|---|---|
| | | 0 hours | 5 hours | 23 hours | 45 hours | 72 hours | 174 hours | 363 hours | 812 hours |
| Example 1' | Transparency (%) | 84.1 | 83.3 | 83.3 | 83.3 | 82.5 | 81.8 | 81.7 | 82 |
| | ΔTransparency (%) | 0 | 0.8 | 0.8 | 0.8 | 1.6 | 2.3 | 2.4 | 2.1 |
| Comparative example 1' | Transparency (%) | 78.7 | 77.6 | 77.1 | 77 | 76.7 | 75.5 | 74.5 | 75.1 |
| | ΔTransparency (%) | 0 | 1.1 | 1.6 | 1.7 | 2 | 3.2 | 4.2 | 3.6 |
| PC Homopolymer | Transparency (%) | 86.1 | 85.1 | 84.3 | 84.5 | 84.5 | 83.1 | 81.3 | 81.5 |
| | ΔTransparency (%) | 0 | 1 | 1.8 | 1.6 | 1.6 | 3 | 4.8 | 4.6 |

TABLE 7

Percentage of haze value for blended plaques before and after exposure to UVB

| Sample | Parameter | UV exposure time | | | | | | | |
|---|---|---|---|---|---|---|---|---|---|
| | | 0 hours | 5 hours | 23 hours | 45 hours | 72 hours | 174 hours | 363 hours | 812 hours |
| Example 1' | Haze (%) | 5.39 | 5.43 | 5.31 | 5.38 | 5.43 | 5.42 | — | 6.82 |
| | ΔHaze (%) | 0 | 0.04 | −0.08 | −0.01 | 0.04 | 0.03 | | 1.43 |
| Comparative example 1' | Haze (%) | 6.66 | 6.68 | 6.48 | 6.4 | 6.22 | 5.96 | 6.39 | 6.72 |
| | ΔHaze (%) | 0 | 0.02 | −0.18 | −0.26 | −0.44 | −0.7 | −0.27 | 0.06 |
| PC Homopolymer | Haze (%) | 2.74 | 3.07 | 3.05 | 3 | 2.99 | 3.2 | 4.02 | 5.94 |
| | ΔHaze (%) | 0 | 0.33 | 0.31 | 0.26 | 0.25 | 0.46 | 1.28 | 3.2 |

The UV weathering resistance studies derived through the yellowness index, transparency and haze measurements depicts that the polycarbonate-polysiloxane copolymers of invention incorporated blends are having improved benefits with relative to the increase in UV exposure time.

While the invention has been described with reference to certain embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention but that the invention will include all embodiments falling within the scope of the appended claims.

The invention claimed is:

1. A polysiloxane having the general structural formula (I):

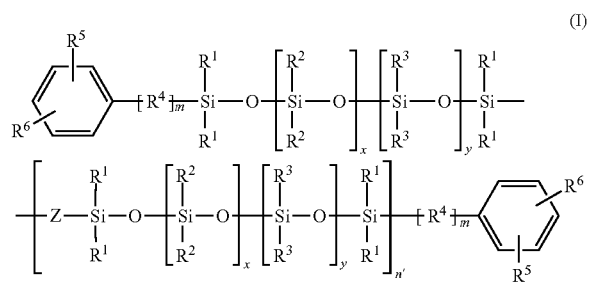

(I)

wherein each of $R^1$, $R^2$ and $R^3$ are independently a linear or branched aliphatic group containing up to about 20 carbon atoms, an un-substituted or substituted aryl group containing from 6 to about 18 carbon atoms, optionally containing at least one heteroatom, and an alicyclic group containing up to about 20 carbon atoms; each $R^4$ is independently a divalent alkyl group of from 1 to about 6 carbon atoms, an un-substituted or substituted aryl group containing up to about 18 carbon atoms, an ester group containing up to about 8 carbon atoms, an ether group containing up to about 8 carbon atoms, or an acetate group containing up to about 8 carbon atoms; each $R^5$ is independently a hydrogen atom, a halogen atom, a linear or branched aliphatic group containing up to about 20 carbon atoms, an un-substituted or substituted aryl group containing from 6 to about 18 carbon atoms, optionally containing at least one heteroatom, an alkoxy group containing from 1 to about 8 carbon atoms, and an unsubstituted or substituted aryloxy group containing up to about 18 carbon atoms; each $R^6$ is independently a hydroxyl group, an amine group, an acid chloride group, and a sulfonyl halide group; each Z is independently selected from a divalent linear, branched or cyclic alkyl group containing from 2 to 25 carbon atoms, a divalent linear, branched or cyclic alkenyl group containing from 2 to 25 carbon atoms, and a divalent un-substituted or substituted aryl group of up to about 20 carbon atoms, and the subscript x is an integer of from 1 to 250, the subscript y is from 0 to 40, the subscript n' is an integer greater than 1, and the subscript m is an integer of from to 1 to 5.

2. A method of preparing the polysiloxane compound (I) of claim 1, comprising:
hydrosilylating a hydride terminated polysiloxane represented by the general structural formula (II)

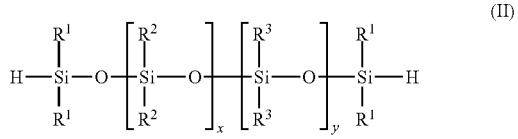

wherein each $R^1$, $R^2$ and $R^3$ are as defined,
with a diene which contains a linear, branched or cyclic alkyl group containing from 2 to 25 carbon atoms or a linear, branched or cyclic alkylene group of from 2 to 25 carbon atoms to obtain a hydride-terminated polysiloxane represented by the structural formula (III):

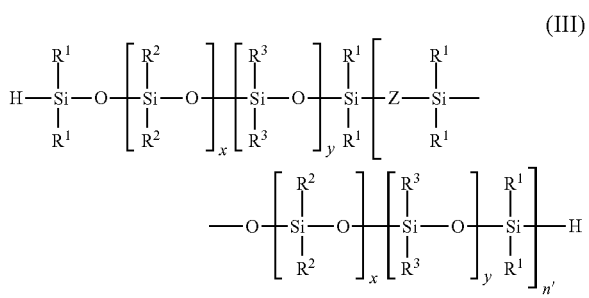

wherein each of $R^1$, $R^2$, $R^3$, Z, x, y and n' are as defined,
followed by hydrosilylation of the hydride-terminated polysiloxane of formula (III) with an unsaturated compound of the general formula (IV):

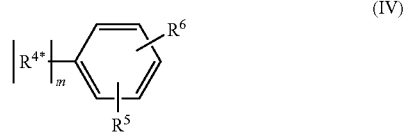

where $R^5$ and $R^6$ are as defined, $R^{4*}$ is selected from alkenyl group containing from 2 to 6 carbon atoms, allyl acetate group containing up to 8 carbon atoms, a vinyl acetate group containing up to 8 carbon atoms, allyl carbonyloxy group of up to 8 carbon atoms, allyl phenyl group of up to about 18 carbon atoms, vinyl phenyl group of up to 18 carbon atoms, allyl ether group of up to 8 carbon atoms, vinyl ether group of up to 8 carbon atoms, wherein one or more of such R4* groups can optionally contain one or more of a hydroxyl group, an alkoxy group of from 1 to 4 carbon atoms, a hetero atom, and the subscript m is an integer of from 1 to 5, and wherein when the subscript m=1, then the aforementioned groups of $R^{4*}$ is a terminal group, and wherein when the subscript m is >1 then $R^{4*}$ comprises at least one divalent group and one terminal group.

3. An article comprising the polysiloxane of claim 1.

4. The article of claim 3, wherein the article is one or more selected from the group consisting of a mobile phone housing, a frozen food service equipment, a helmet, a helmet shield, an automotive windshield, a motorcycle windshield, an automotive sunroof, a roof, a dashboard, a headlamp, an electric screen a medical article, a medical tube and a medical bag.

5. A copolymer comprising a structural unit represented by the structural formula (V):

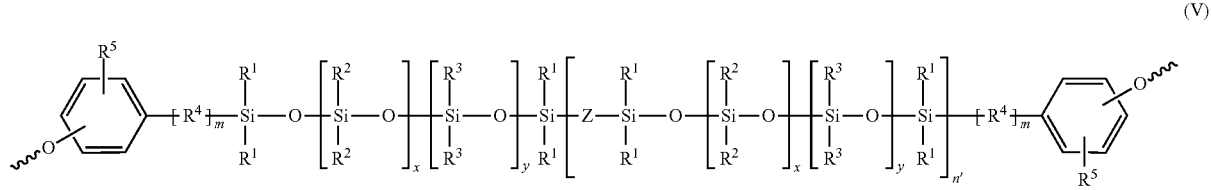

wherein each of $R^1$, $R^2$ and $R^3$ are independently a linear or branched aliphatic group containing up to about 20 carbon atoms, an un-substituted or substituted aryl group containing from 6 to about 18 carbon atoms, optionally containing at least one heteroatom, or an alicyclic group containing up to about 20 carbon atoms; each $R^4$ is independently, a divalent alkyl group of from 1 to about 6 carbon atoms, an un-substituted or substituted aryl group containing up to about 18 carbon atoms, an ester group containing up to about 8 carbon atoms, an ether group containing up to about 8 carbon atoms, or an acetate group containing up to about 8 carbon atoms; each $R^5$ is independently a hydrogen atom, a halogen atom, a linear or branched aliphatic group containing up to about 20 carbon atoms, an un-substituted or substituted aryl group containing from 6 to about 18 carbon atoms, optionally containing at least one heteroatom, an alkoxy group containing from 1 to about 8 carbon atoms, or an unsubstituted or substituted aryloxy group containing up to about 18 carbon atoms; each Z is independently a divalent linear, branched or cyclic alkyl group containing from 2 to 25 carbon atoms or a divalent linear, branched or cyclic alkenyl group containing from 2 to 25 carbon atoms; and the subscript x is an integer of from 1 to 250; the subscript y is from 0 to 40; the subscript n' is an integer greater than 1; and the subscript m is an integer of from to 1 to 5.

6. The copolymer of claim 5 wherein the copolymer further comprises a structural unit of any one or more of a polycarbonate, a polyester, a polyetherketone or a polysulfone.

7. The copolymer of claim 5, further comprising a structural unit having the general formula (VI):

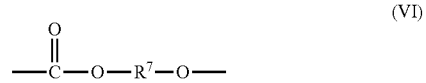

wherein each $R^7$ is a divalent hydrocarbon group containing from 1 to 60 carbon atoms, a group derived from a structural unit having the general formula (VII):

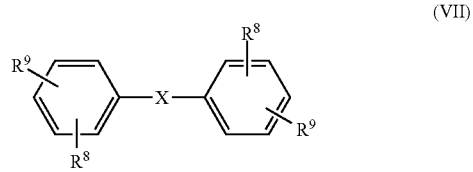

where each $R^8$ is independently selected from hydrogen, halogen, an aliphatic group containing from 1 to 6 carbon atoms, an aromatic group containing from 6 to 8 carbon atoms, an alkoxy group containing from 1 to 6 carbon atoms, or an aryloxy group containing from 6 to 18 carbon atoms; and each $R^9$ is independently chosen from a hydroxyl group, an amine group, an acid chloride group, or a sulfonyl halide group; and X is selected from the group consisting of:

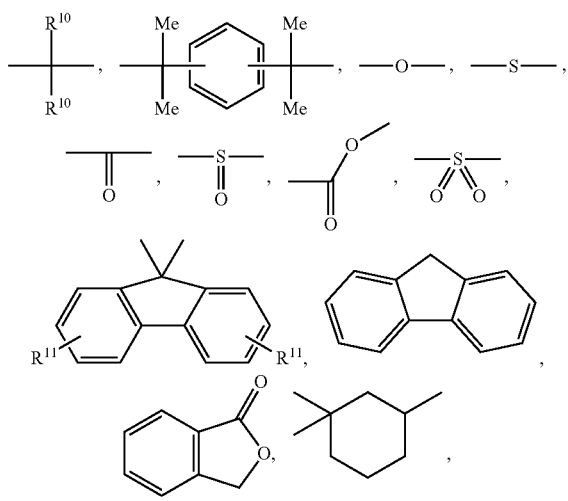

-continued

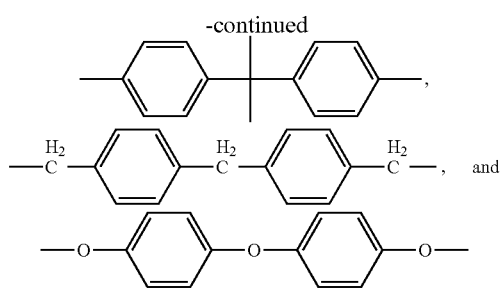

wherein each $R^{10}$ and each $R^{11}$ are independently chosen from hydrogen, halogen, an alkyl group containing from 1 to 18 carbon atoms, an aryl group containing from 3 to 14 carbon atoms, an aryloxy group containing from 6 to 18 carbon atoms, an aralkyl group containing from 7 to 20 carbon atoms, an alkoxy group containing from 1 to 10 carbon atoms, a cycloalkyl group containing from 6 to 20 carbon atoms, a cycloalkoxy group containing from 6 to 20 carbon atoms, an alkenyl group containing from 2 to 10 carbon atoms, an aralkyloxy group containing from 7 to 20 carbon atoms, a nitro group, an aldehyde group, a cyano group, or a carboxyl group.

8. The copolymer of claim 7 wherein $R^9$ is a hydroxy group and $R^{10}$ is an alkyl group of from 1 to 6 carbon atoms.

9. A composition comprising the copolymer of claim 7, and at least one of a polycarbonate homopolymer, a different polycarbonate copolymer, a polycarbonate-polyester, a polyester, a polysulfone, a polyethersulfone, a polyetheretherketone, a polyimide or a polyetherimide.

10. An article comprising the composition of claim 9.

11. The article of claim 10, wherein the article is one or more selected from the group consisting of a mobile phone housing, a frozen food service equipment, a helmet, a helmet shield, an automotive windshield, a motorcycle windshield, an automotive sunroof, a roof, a dashboard, a headlamp, an electric screen a medical article, a medical tube, a medical bag.

12. A method of making an article comprising: molding, shaping, or forming the composition of claim 9 to obtain the article.

13. An article comprising the copolymer of claim 5.

14. The article of claim 13, wherein the article is one or more selected from the group consisting of a mobile phone housing, a frozen food service equipment, a helmet, a helmet shield, an automotive windshield, a motorcycle windshield, an automotive sunroof, a roof, a dashboard, a headlamp, or electric screen a medical article, a medical tube and a medical bag.

15. A method of preparing a polycarbonate-polysiloxane copolymer, comprising:
polymerizing a polysiloxane represented by the general formula (I):

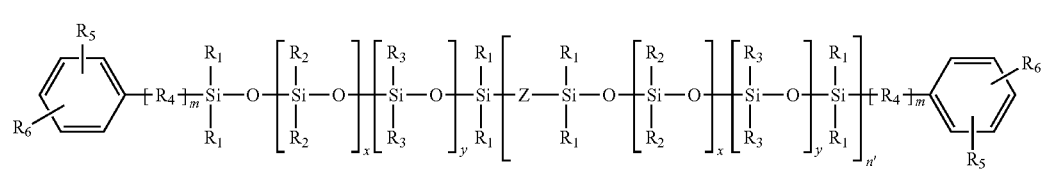

wherein each of $R^1$, $R^2$ and $R^3$ are independently a linear or branched aliphatic group containing up to about 20 carbon atoms, an un-substituted or substituted aryl group containing from 6 to about 18 carbon atoms, optionally containing at least one heteroatom, or an alicyclic group containing up to about 20 carbon atoms; each $R^4$ is independently, a divalent alkyl group of from 1 to about 6 carbon atoms, an un-substituted or substituted aryl group containing up to about 18 carbon atoms, an ester group containing up to about 8 carbon atoms, an ether group containing up to about 8 carbon atoms, or an acetate group containing up to about 8 carbon atoms; each $R^5$ is independently a hydrogen atom, a halogen atom, a linear or branched aliphatic group containing up to about 20 carbon atoms, an un-substituted or substituted aryl group containing from 6 to about 18 carbon atoms, optionally containing at least one heteroatom, an alkoxy group containing from 1 to about 8 carbon atoms, or an unsubstituted or substituted aryloxy group containing up to about 18 carbon atoms; each $R^6$ is independently a hydroxyl group, an amine group, an acid chloride group, or a sulfonyl halide group; each Z is independently a divalent linear, branched or cyclic alkyl group containing from 2 to 25 carbon atoms or a divalent linear, branched or cyclic alkenyl group containing from 2 to 25 carbon atoms, and the subscript x is an integer of from 1 to 250, the subscript y is from 0 to 40, the subscript n' is an integer greater than 1, and the subscript m is an integer of from to 1 to 5,
with a compound of the general formula (IV):

(VII)

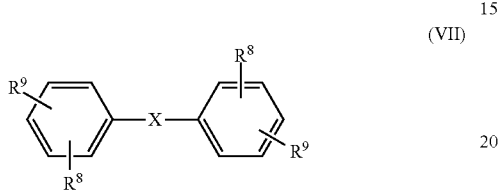

wherein each $R^8$ is independently selected from hydrogen, halogen, an aliphatic group containing from 1 to 6 carbon atoms, an aromatic group containing from 6 to 8 carbon atoms, an alkoxy group containing from 1 to 6 carbon atoms, or an aryloxy group containing from 6 to 18 carbon atoms; and each $R^9$ is independently chosen from a hydroxyl group, an amine group, an acid chloride group, or a sulfonyl halide group; and X is selected from the group consisting of:

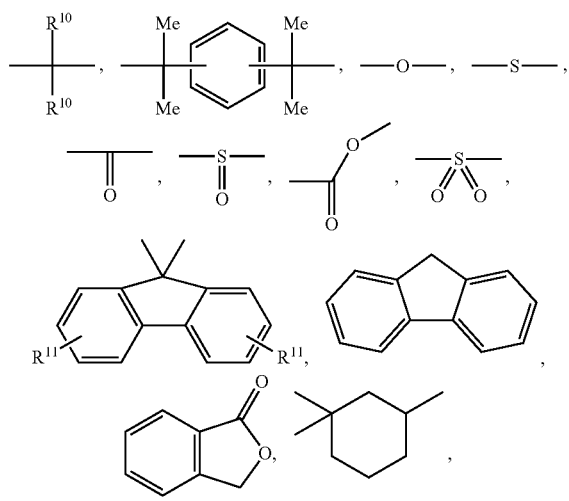

wherein each $R^{10}$ and each $R^{11}$ are independently chosen from hydrogen, halogen, an alkyl group containing from 1 to 18 carbon atoms, an aryl group containing from 3 to 14 carbon atoms, an aryloxy group containing from 6 to 10 carbon atoms, an aralkyl group containing from 7 to 20 carbon atoms, an alkoxy group containing from 1 to 10 carbon atoms, a cycloalkyl group containing from 6 to 20 carbon atoms, a cycloalkoxy group containing from 6 to 20 carbon atoms, an alkenyl group containing from 2 to 10 carbon atoms, an aralkyloxy group containing from 7 to 20 carbon atoms, a nitro group, an aldehyde group, a cyano group, or a carboxyl group, and in the presence of a carbonate precursor, to provide a polycarbonate-polysiloxane copolymer.

16. The method of claim 15, wherein the carbonate precursor is at least one selected from the group consisting of phosgene, diphosgene, triphosgene, diarylcarbonates, bis(methylsalicyl)carbonate and combinations thereof.

17. The method of claim 15, wherein the polymerizing step is an interfacial polymerization process conducted in the presence of at least one of a solvent, a caustic and optionally one or more catalysts.

18. The method of claim 15, wherein the polymerizing step comprises reacting bisphenol A with triphosgene in a biphasic solvent in the presence of a phase transfer catalyst to form a bischloroformate; and adding a hydroxy-terminated silicone of formula (1) to form the polycarbonate-polysiloxane copolymer.

19. The method of claim 18, wherein the chloroformates of the hydroxy-terminated silicone are formed in a tube reactor, and added into an interfacial polycondensation reactor with catalyst.

20. A polycarbonate-polysiloxane copolymer made by the method of claim 15.

21. An article comprising the polycarbonate-polysiloxane copolymer of claim 20.

* * * * *